(12) United States Patent
Dong

(10) Patent No.: US 12,434,534 B2
(45) Date of Patent: Oct. 7, 2025

(54) SUSPENSION SYSTEM FOR VEHICLE AIR CONDITIONER COMPRESSOR, AND VEHICLE

(71) Applicants: Zhejiang Geely Holding Group Co., Ltd, Hangzhou (CN); Zhejiang Liankong Technologies Co., Ltd, Ningbo (CN)

(72) Inventor: Yanliang Dong, Hangzhou (CN)

(73) Assignees: Zhejiang Geely Holding Group Co., Ltd, Hangzhou (CN); Zhejiang Liankong Technologies Co., Ltd, Ningbo (CN)

(*) Notice: Subject to any disclaimer, the term of this patent is extended or adjusted under 35 U.S.C. 154(b) by 127 days.

(21) Appl. No.: 18/035,755

(22) PCT Filed: Dec. 11, 2020

(86) PCT No.: PCT/CN2020/135756
§ 371 (c)(1),
(2) Date: May 8, 2023

(87) PCT Pub. No.: WO2022/120801
PCT Pub. Date: Jun. 16, 2022

(65) Prior Publication Data
US 2024/0010043 A1    Jan. 11, 2024

(51) Int. Cl.
*B60H 1/00* (2006.01)

(52) U.S. Cl.
CPC ... *B60H 1/00507* (2013.01); *B60H 2001/006* (2013.01)

(58) Field of Classification Search
CPC ............ B60H 1/00507; B60H 2001/006
See application file for complete search history.

(56) References Cited

U.S. PATENT DOCUMENTS 3,785,167 A * 1/1974 Sahs .................... F25D 23/006
62/297
5,221,192 A * 6/1993 Heflin .................... F16F 1/373
417/363
(Continued)

FOREIGN PATENT DOCUMENTS

CN          102758759 A       10/2012
CN          104691305 A        6/2015
(Continued)

OTHER PUBLICATIONS

The office action of JP application No. 2023-518227 issued on Oct. 24, 2023.
(Continued)

*Primary Examiner* — Eret C Mcnichols
(74) *Attorney, Agent, or Firm* — Andrew C. Cheng

(57) ABSTRACT

A suspension system for a vehicle air conditioner compressor and a vehicle are provided. The suspension system includes: a plurality of rubber dampers a plurality of resilient dampers with a plurality of damper springs; a first compressor bracket connected with the vehicle air conditioner compressor through the plurality of rubber dampers; and a second compressor bracket connected with a vehicle body and with the first compressor bracket through the plurality of resilient dampers. The suspension system for the vehicle air conditioner compressor and the vehicle can solve the problem of low-order vibration and achieve more reasonable modal decoupling, thereby ensuring that the vehicle have better NVH performance.

17 Claims, 2 Drawing Sheets

(56) References Cited

U.S. PATENT DOCUMENTS

| | | | | |
|---|---|---|---|---|
| 5,306,121 A * | 4/1994 | Heflin | ................... | F16F 15/08 |
| | | | | 417/363 |
| 5,342,179 A * | 8/1994 | Dreiman | ................... | F16F 3/02 |
| | | | | 417/363 |
| 5,964,579 A * | 10/1999 | Tang | ................... | F04B 39/0044 |
| | | | | 417/363 |
| 6,336,794 B1 * | 1/2002 | Kim | ................... | F04B 39/0044 |
| | | | | 417/363 |
| 7,398,655 B2 * | 7/2008 | Yun | ................... | F25D 23/006 |
| | | | | 181/403 |
| 7,819,638 B2 * | 10/2010 | Grimm | ................... | F16F 15/08 |
| | | | | 248/603 |
| 8,051,933 B2 * | 11/2011 | Hwang | ................... | B60K 11/04 |
| | | | | 180/68.6 |
| 9,169,893 B2 * | 10/2015 | Williamson | ............ | E02D 3/046 |
| 10,359,225 B2 * | 7/2019 | Lesko | ................... | F25D 23/006 |
| 10,591,074 B2 * | 3/2020 | Horváth | ................ | F16K 15/026 |
| 10,774,558 B2 * | 9/2020 | Martin Hernandez | ...................... | |
| | | | | H05K 7/1495 |
| 10,830,223 B2 * | 11/2020 | Qi | ........................ | B60H 1/3229 |
| 11,078,985 B2 * | 8/2021 | Kim | ...................... | F16F 1/3849 |
| 2006/0067838 A1 * | 3/2006 | Grimm | ............. | B60H 1/00507 |
| | | | | 417/363 |
| 2009/0229281 A1 * | 9/2009 | Harris | ................ | B60H 1/00535 |
| | | | | 62/323.3 |
| 2015/0159805 A1 * | 6/2015 | Lee | ........................ | F04D 29/605 |
| | | | | 248/634 |
| 2022/0204080 A1 * | 6/2022 | Mueller | ................ | F16F 1/3835 |
| 2023/0031696 A1 * | 2/2023 | Kuebler | .................... | F16F 3/12 |
| 2024/0301937 A1 * | 9/2024 | Nakazato | ............... | F16F 9/54 |

FOREIGN PATENT DOCUMENTS

| | | | | |
|---|---|---|---|---|
| CN | 205022326 U | 2/2016 | | |
| CN | 205097873 U | 3/2016 | | |
| CN | 105899807 A | 8/2016 | | |
| CN | 106523324 A | 3/2017 | | |
| CN | 108162716 A | 6/2018 | | |
| CN | 109130769 A | 1/2019 | | |
| CN | 209395541 U | 9/2019 | | |
| CN | 211259460 U | 8/2020 | | |
| DE | 102004027227 A1 * | 12/2005 | ............ | F16F 15/085 |
| DE | 102006051383 A1 * | 4/2008 | ......... | B60H 1/00535 |
| DE | 112014005119 T5 | 7/2016 | | |
| JP | 2017044313 A | 3/2017 | | |
| JP | 2020067109 A | 4/2020 | | |

OTHER PUBLICATIONS

International Search Report of PCT Patent Application No. PCT/CN2020/135756 issued on Aug. 26, 2021.

The extended European search report of EP patent application No. 20964737.9 issued on Oct. 14, 2024.

The first office action of CN patent application No. 202080103494.X issued on Apr. 16, 2025.

The first search report of CN patent application No. 202080103494.X issued on Apr. 16, 2025.

* cited by examiner

SUSPENSION SYSTEM FOR VEHICLE AIR CONDITIONER COMPRESSOR, AND VEHICLE

CROSS REFERENCE TO RELATED APPLICATIONS

This application is a 35 U.S.C. § 371 National Phase conversion of International (PCT) Patent Application No. PCT/CN2020/135756, filed on Dec. 11, 2020. The contents of the above-identified applications are incorporated herein by reference. The PCT International Patent Application was filed and published in Chinese.

TECHNICAL FIELD

The present document relates to a technical field of vehicles, in particular to a suspension system for a vehicle air conditioner compressor and a vehicle.

BACKGROUND

Air conditioner compressors usually have hard connection with engines or motor housings through brackets. The vibration energy generated by the air conditioner compressors is generally absorbed by suspensions.

When developing a rear-driven type vehicle, the motor is arranged at a rear portion of the vehicle, if the compressor is fixed directly to the motor, a pipeline of the air conditioner will be lengthy, costly and complex. Therefore, the compressor is usually arranged in a front compartment of the vehicle. In this case, the compressor is usually fixed on the subframe or the crossbeam. Because of the NVH problem of low-order vibration, noise and high frequency vibration noise generated during operation of the compressor, the NVH performance of the whole vehicle is poor and the ride comfort in the vehicle is poor as well.

SUMMARY

The present document is proposed to disclose a suspension system for an air conditioner compressor which can overcome or at least partially solve the above mentioned problems, and a vehicle.

An object of a first aspect of the present document is to provide a suspension system with better NVH performance.

Another object of the present document is to solve the problem of low-order vibration.

A further object of the present document is to realize more reasonable modal decoupling at an installation point of the vehicle air conditioner compressor.

An object of a second aspect of the present document is to provide a vehicle including the abovementioned suspension system, to ensure that the vehicle has better NVH performance.

One aspect of an embodiment of the present document discloses a suspension system for a vehicle air conditioner compressor including:
  a plurality of rubber dampers;
  a plurality of resilient dampers with a plurality of damper springs;
  a first compressor bracket connected with the vehicle air conditioner compressor through the plurality of rubber dampers;
  a second compressor bracket connected with a vehicle body and connected with the first compressor bracket through the plurality of resilient dampers.

In some embodiments, each of the resilient dampers is arranged along a vertical direction.

In some embodiments, each of the rubber dampers is arranged along a horizontal direction.

In some embodiments, the plurality of the rubber dampers are respectively disposed at opposite sides of the first compressor bracket.

In some embodiments, the resilient damper further includes:
  a first inner sleeve including a first main body and a first limit flange protruding from an outer surface of the first main body;
  a first limit rubber sleeved around the first main body, an outer surface of the first limit rubber is provided with a limit ring protruding therefrom, the damper spring is sleeved around the first limit rubber and disposed between the first limit flange and the limit ring; and
  a limit washer sleeved around the first main body and located at a bottom portion of the first limit rubber;
  the suspension system further includes:
  a fastening assembly configured for passing through the first inner sleeve and the limit washer to mount the resilient damper between the first compressor bracket and the second compressor bracket.

In some embodiments, a top surface of the first limit flange abuts against a bottom surface of the first compressor bracket, and a bottom surface of the limit washer abuts against a top surface of the second compressor bracket;
  the first compressor bracket and the second compressor bracket are both provided with a plurality of bolt mounting holes aligned with each other; and
  the fastening assembly includes a plurality of fastening bolts and a plurality of nuts, the plurality of fastening bolts are configured for sequentially passing through the bolt mounting holes of the first compressor bracket, the first inner sleeves, the limit washers and the bolt mounting holes of the second compressor bracket and being tightened by the nuts.

In some embodiments, a top surface of the first limit flange abuts against a top surface of the second compressor bracket;
  the second compressor bracket is provided with a plurality of bolt mounting holes, the first compressor bracket is provided with a plurality of first mounting holes aligned with the bolt mounting holes, a part of the first limit rubber that is not sleeved by the damper spring is connected with the first mounting hole by interference fit;
  the fastening assembly includes a plurality of fastening bolts and a plurality of nuts, the plurality of fastening bolts are configured for sequentially passing through the bolt mounting holes of the second compressor bracket, the first inner sleeves and the limit washers and being tightened by the nuts.

In some embodiments, a top surface and a bottom surface of the first limit rubber are provided with a plurality of bulges.

In some embodiments, the rubber damper includes:
  a second inner sleeve including a second main body and a second limit flange protruding from an outer surface of the second main body; and
  a second limit rubber connected to an outer side of the second main body by interference fit.

In some embodiments, the rubber damper is arranged to one of an eccentric structure and a non-eccentric structure.

In some embodiments, the first compressor bracket is provided with a plurality of second mounting holes at positions corresponding to the rubber dampers, the second limit rubber is clamped in the second mounting hole.

In some embodiments, the suspension system further includes:

a plurality of fasteners, which are configured for connecting with the vehicle air conditioner compressor after passing through the second inner sleeve.

In some embodiments, the first compressor bracket has a first side, a second side opposite to the first side, a third side and a fourth side opposite to the third side, the first side is provided with one rubber damper, the second side is provided with two rubber dampers, and the third side is provided with one resilient damper, the fourth side is provided with two resilient dampers.

In some embodiments, the second compressor bracket comprises two sub-brackets, which are respectively arranged at the third side and the fourth side.

In some embodiments, the first compressor bracket and the second compressor bracket are made of high-pressure cast aluminum alloy.

In some embodiments, the second compressor bracket is arranged on a top portion of the vehicle body.

Another aspect of the embodiment of the present document discloses a vehicle including a vehicle air conditioner compressor, a vehicle body and a suspension system described in anyone of the abovementioned embodiments.

The present document includes two supports (i.e., the first compressor support and the second compressor support), sets a plurality of rubber dampers between the first compressor support and the vehicle air conditioner compressor, and sets a plurality of resilient dampers between the first compressor support and the second compressor support, which makes the whole suspension system form a two-stage vibration isolation system, overturn the traditional layout, can effectively absorb the vibration generated during operation of the vehicle air conditioner compressor, be capable of reducing the vibration transmitted to the vehicle body, thus reducing the noise inside and outside the passenger compartment, and improving the ride comfort and NVH performance of the vehicle.

Furthermore, the low stiffness rubber can not meet the durability of the whole vehicle. In contrary, the resilient damper of the present document includes the damper springs, which has lower dynamic and static stiffness and better durability, and can meet the durability of the components under the condition of ensuring the low rigid body mode of the target system.

In some embodiments, the present document arranges multiple rubber dampers on opposite sides to achieve more reasonable modal decoupling of the mounting point of the vehicle air conditioner compressor and ensure better NVH performance.

The above description is only an overview of the technical solution of the present document. In order to better understand the technical means of the present document, it can be implemented according to contents of the specification, and in order to make the abovementioned and other purposes, features and advantages of the present document more obvious and understandable, the specific embodiments of the present document are given as below.

According to the following detailed description of the specific embodiments of the present document in combination with the attached drawings, those having ordinary skill in the art will be more aware of the abovementioned and other purposes, advantages and features of the present document.

BRIEF DESCRIPTION OF THE DRAWINGS

Some embodiments of the present document will be described in detail in an illustrative but not restrictive manner with reference to the accompanying drawings. The same reference numbers in the drawings indicate the same or similar components or parts. Those having ordinary skill in the art should understand that these drawings are not drawn to scale. In the attached drawings.

DETAILED DESCRIPTION OF PREFERRED EMBODIMENTS

Figure 1:
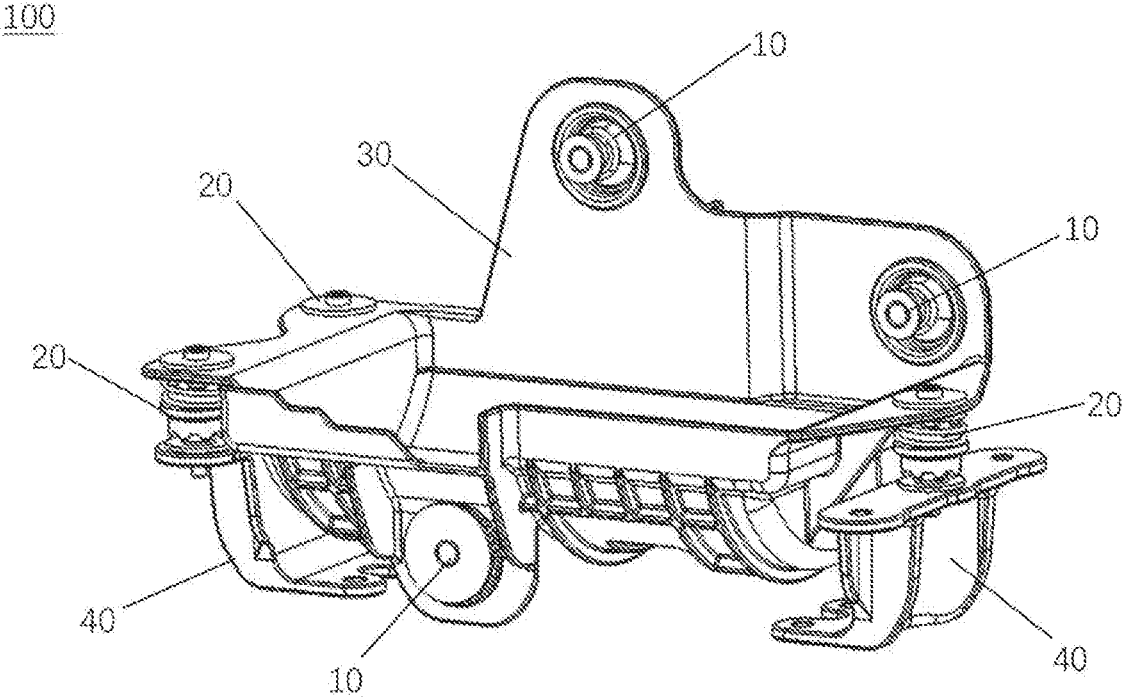
FIG. 1 is a schematic, isometric view of a suspension system for a vehicle air conditioner compressor according to an embodiment of the present document.

Exemplary embodiments of the present disclosure will be described in detail with reference to the accompanying drawings. Although exemplary embodiments of the present disclosure are shown in the drawings, it should be understood that the present disclosure can be implemented in various forms and should not be limited by the embodiments described herein. On the contrary, these embodiments are provided in order to understand the present disclosure more thoroughly and the scope of the present disclosure can be conveyed to those of ordinary skill in the art completely.

FIG. 1 is a schematic, isometric view of a suspension system 100 for a vehicle air conditioner compressor according to an embodiment of the present document. Referring to FIG. 1, in one embodiment of the present document, the suspension system 100 includes a plurality of rubber dampers 10, a plurality of resilient dampers 20 with a plurality of damper springs 21, a first compressor support 30 and a second compressor support 40. The first compressor support 30 is connected with a vehicle air conditioner compressor through the rubber dampers 10. The second compressor support 40 is connected with a vehicle body (for example, a crossbeam) and is connected with the first compressor support 30 through the resilient dampers 20. The first compressor support 30 and the second compressor support 40 can be made of, but not limited to, high pressure die-casting aluminum alloy. In some embodiments, the second compressor support 40 is disposed on a top portion of the vehicle body (for example, a top portion of the crossbeam). That is, the vehicle air conditioner compressor is disposed on the top portion of the vehicle body through the suspension system 100. In some embodiments, according to the space limit of the vehicle, the installation position of the vehicle air conditioner compressor can be adjusted but not limited by changing the shape and the mounting holes of the suspension system 100.

In this embodiment, the suspension system 100 includes two supports (i.e. the first compressor support 30 and the second compressor support 40), sets a plurality of rubber dampers 10 between the first compressor support 30 and the vehicle air conditioner compressor, and sets a plurality of resilient dampers 20 between the first compressor support 30 and the second compressor support 40, which makes the suspension system 100 form a two-stage vibration isolation system, overturn a traditional layout, can effectively absorb the vibration generated during operation of the vehicle air conditioner compressor, be capable of reducing the vibration transmitted to the vehicle body, thus reducing the noise inside and outside the passenger compartment, and improving the ride comfort and NVH performance of the vehicle.

In some embodiments, low stiffness rubber can not meet the durability of the whole vehicle. In contrary, the resilient damper 20 in this embodiment includes the damper spring 21, which has lower dynamic and static stiffness and better durability, and can meet the durability of the components under the condition of ensuring a low rigid body mode of the target system.

As shown in FIG. 1, in one embodiment, each of the resilient dampers 20 is arranged along a vertical direction (i.e. along a Z direction of the vehicle). Each of the rubber dampers 10 is arranged along a horizontal direction. Through the vertically arranged resilient dampers 20, a load of the vehicle air conditioner compressor and the suspension system 100 can be finally reflected in the gravity direction, i.e., the Z direction of the vehicle, which effectively reduces the durability risk, greatly increases the service life of the components, thereby obtaining a good rigid body mode of the system under low stiffness, and improving the NVH performance.

In another embodiment, the plurality of rubber dampers 10 are respectively located at opposite sides of the first compressor support 30.

In this embodiment, the plurality of rubber dampers 10 are arranged on opposite sides of the first compressor support 30, which achieves more reasonable modal decoupling at the installation point of the vehicle air conditioner compressor and ensures better NVH performance.

The first compressor support 30 has a first side and a second side opposite to each other along the vertical direction, and a third side and a fourth side opposite to each other along the horizontal direction. Referring to FIG. 1, in one embodiment, one rubber damper 10 is arranged at the first side, two rubber dampers 10 are arranged at the second side, a resilient damper 20 is arranged at the third side, and two resilient dampers 20 are arranged at the fourth side. The rubber damper 10 on the first side is at the lowest position compared with other dampers, and the rubber damper 10 at the lowest position is arranged contrary to the two rubber dampers 10 on the second side.

Figure 2:
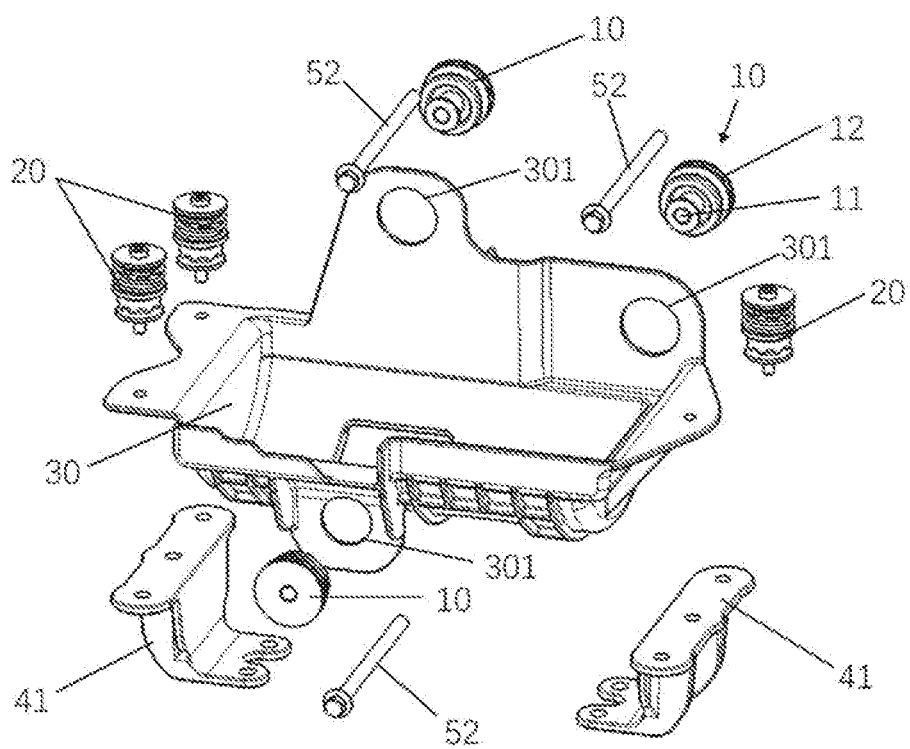
FIG. 2 is a schematic, exploded view of the suspension system for the vehicle air conditioner compressor according to an embodiment of the present document.

Referring to FIG. 2, in one embodiment, the second compressor support 40 includes two L-shaped sub-brackets 41, which are respectively arranged at the third side and the fourth side. Alternatively, in other embodiments, the second compressor support 40 may be a single component with its two ends extending to the third side and the fourth side of the first compressor support 30, to meet the installation requirements.

FIG. 2 is a schematic, exploded view of the suspension system 100 for the vehicle air conditioner compressor according to an embodiment of the present document. Referring to FIG. 2, in one embodiment, the first compressor support 30 is substantially a semi-cylindrical shaped structure, in which a cavity for accommodating part of the vehicle air conditioner compressor is defined in a middle portion thereof. The first side and the second side of the first compressor support 30 are respectively provided with vertical mounting surfaces for installing the rubber dampers 10. The third side and the fourth side of the first compressor support 30 are respectively provided with horizontal mounting surfaces for mounting the resilient dampers 20.

Figure 3:
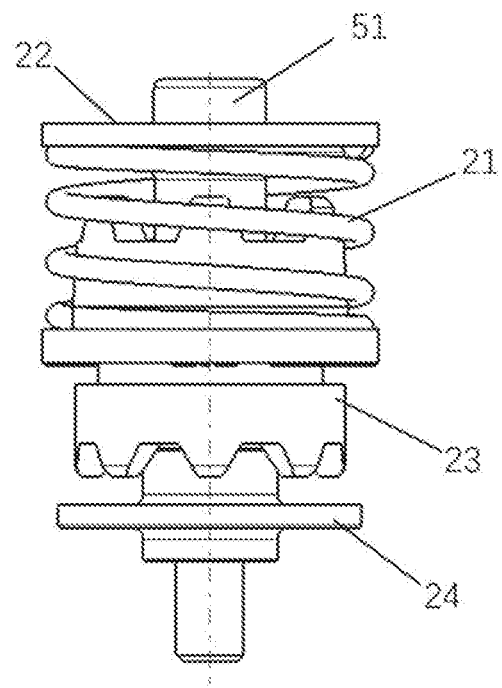
FIG. 3 is a schematic, isometric view of an assembly of a resilient damper and a fastening bolt of the suspension system for the vehicle air conditioner compressor according to an embodiment of the present document.
Figure 4:
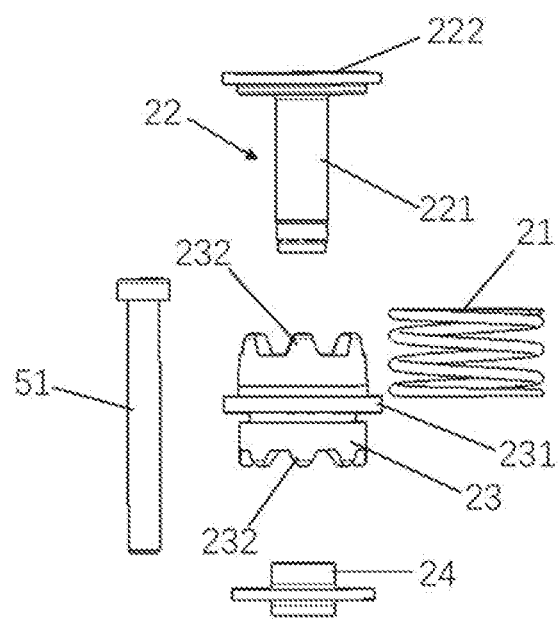
FIG. 4 is a schematic, exploded view of the assembly of the resilient damper and the fastening bolt of the suspension system for the vehicle air conditioner compressor according to an embodiment of the present document.

FIG. 3 is a schematic, isometric view of an assembly of the resilient damper 20 and a fastening bolt 51 of the suspension system 100 for the vehicle air conditioner compressor according to an embodiment of the present document. FIG. 4 is a schematic, exploded view of the assembly of the resilient damper and the fastening bolt of the suspension system for the vehicle air conditioner compressor according to an embodiment of the present document. Referring to FIG. 3, the resilient damper 20 further includes a first inner sleeve 22, a first limit rubber 23 and a limit washer 24. Referring to FIG. 4, the first inner sleeve 22 includes a first main body 221 and a first limit flange 222 radially protruding from an outer surface of the first main body 221. The first limit rubber 23 is sleeved around the first main body 221, and an outer surface of the first limit rubber 23 is provided with a limit ring 231 radially protruding therefrom. The damper spring 21 is sleeved (for example, interference fit) around the first limit rubber 23 and disposed between the first limit flange 222 and the limit ring 231. The limit washer 24 is sleeved around of the first main body 221 and is located at the bottom of the first limit rubber 23. In this embodiment, the first limit rubber 23 and the limit washer 24 may be connected in clearance fit manner. The suspension system 100 further includes a fastening assembly for passing through the first inner sleeve 22 and the limit washer 24 to mount the resilient damper 20 between the first compressor support 30 and the second compressor support 40.

As shown in FIG. 1, in one embodiment, the top surface of the first limit flange 222 abuts against the bottom surface of the first compressor support 30, and the bottom of the limit washer 24 abuts against the top surface of the second compressor support 40. The first compressor support 30 and the second compressor support 40 are both provided with a plurality of bolt mounting holes. The fastening assembly includes a plurality of fastening bolts 51 and nuts. The fastening bolts 51 sequentially pass through the bolt mounting holes of the first compressor support 30, the first inner sleeves 22, the limit washers 24 and the bolt mounting holes of the second compressor support 40, and are tighten by the nuts.

In this embodiment, when the vehicle air conditioner compressor generates small vibration, the damper spring 21 with small stiffness is firstly compressed to bear a part of the force, thus absorbing the vibration energy. If the vibration force continues to increase, for example, if the vehicle passes through a pothole or a ridge, the damper spring 21 will be compressed by the increased load and force the first limit rubber 23 to contact with the first limit flange 222 and the limit washer 24, further absorbing the vibration energy.

In one embodiment, if the resilient damper 20 in FIG. 1 is turned upside down, the top surface of the first limit flange 222 abuts against the top surface of the second compressor support 40. The second compressor support 40 is provided with a plurality of bolt mounting holes, the first compressor support 30 is provided with a plurality of first mounting holes aligned with the bolt mounting holes, and the part of the first limit rubber 23 that is not sleeved by the damper spring 21 is connected with the first mounting hole by interference fit. The fastening assembly includes a plurality of fastening bolts 51 and nuts. The fastening bolts 51 pass through the bolt mounting holes of the second compressor support 40, the first inner sleeves 22 and the limit washers 24 and are tighten by the nuts. This embodiment can also absorb vibration in Z-direction. In the embodiments, the arrangement and installation mode of the resilient damper 20 can be selected according to the damping effect and the installation space.

In one embodiment, referring to FIG. 4, the top and the bottom surfaces of the first limit rubber 23 are both provided with a plurality of bulges 232. Under the same hardness, the rubber stiffness of an entire structure formed by the bulges 232 will be lower than that of a structure with a plane surface. In some embodiments, the shape of the top and the bottom surfaces of the first limit rubber 23 can be set according to the stiffness requirements.

As shown in FIG. 2, in one embodiment, the rubber damper 10 includes a second inner sleeve 11 and a second limit rubber 12. The second inner sleeve 11 includes a second main body and a second limit flange radially protruding from an outer surface of the second main body. The second limit rubber 12 is connected to an outer side of the second main body by interference fit. By means of interference connection, the second inner sleeve 11 and the second limit rubber 12 no longer need to be connected through vulcanization process, which greatly reduces the development cost.

In one embodiment, the rubber damper 10 is arranged in an eccentric structure or a non-eccentric structure. The eccentric structure means that a central axis of the second limit rubber 12 is coincide with a central axis of the second inner sleeve 11, and the non-eccentric structure means that the central axis of the second limit rubber 12 is not coincide with the central axis of the second inner sleeve 11. The rubber damper 10 can be arranged to an eccentric structure or a non-eccentric structure according to working conditions.

In one embodiment, referring to FIG. 2, a plurality of second mounting holes 301 are arranged on the first compressor support 30 at positions corresponding to the rubber dampers 10. For example, the two sides of the first compressor support 30 are respectively provided with the second mounting holes 301 for installing the rubber damper 10. The second limit rubber 12 is clamped in the second mounting hole 301 (see FIG. 1). Optionally, referring to FIG. 2, the height of the second mounting holes 301 can be set differently.

In one embodiment, the suspension system 100 further includes a plurality of fasteners 52 for connecting with the vehicle air conditioner compressor after passing through the second inner sleeve 11. For example, the fastener 52 is a bolt, and a housing of the vehicle air conditioner compressor is provided with a threaded hole allowing the bolt passing through. The rubber damper 10 can be firmly connected with the vehicle air conditioner compressor by tightening the bolt.

In one embodiment, the stiffness of the damper spring 21 may be much lower than that of ordinary rubber, and the rigid body mode of the whole suspension system 100 may be lower than 20 Hz. The present document solves the NVH problem of low-order vibration, noise and high frequency vibration noise caused during the operation of the vehicle air conditioner compressor.

The present document also provides a vehicle, which includes a vehicle air conditioner compressor, a vehicle body and a suspension system 100 in any of the above embodiments or combinations.

The vehicle is provided with two supports (i.e., the first compressor support 30 and the second compressor support 40), sets a plurality of rubber dampers 10 between the first compressor support 30 and the vehicle air conditioner compressor, and sets a plurality of resilient dampers 20 between the first compressor support 30 and the second compressor support 40, which makes the whole suspension system 100 form a two-stage vibration isolation system, overturn the traditional layout, can effectively absorb the vibration generated during operation of the vehicle air conditioner compressor, be capable of reducing the vibration transmitted to the vehicle body, thus reducing the noise inside and outside the passenger compartment, and improving the ride comfort and NVH performance of the vehicle.

Furthermore, the low stiffness rubber can not meet the durability of the whole vehicle. In contrary, the resilient damper 20 of the present disclosure includes the damper springs, which has lower dynamic and static stiffness and better durability, and can meet the durability of the components under the condition of ensuring the low rigid body mode of the target system.

At this point, those have ordinary skill in the art should recognize that, although the exemplary embodiments of the present document have been shown and described in detail, many other variations or modifications that conform to the principles of the present document can be directly determined or derived from the contents of the present document without departing from the spirit and scope of the present document. Therefore, the protection scope of the present document should be understood and recognized as covering all the variants or modifications.

What is claimed is:

1. A suspension system for vehicle air conditioner compressor, comprising:
    a plurality of rubber dampers;
    a plurality of resilient dampers with a plurality of damper springs;
    a first compressor bracket connected with the vehicle air conditioner compressor through the plurality of rubber dampers;
    a second compressor bracket connected with a vehicle body and connected with the first compressor bracket through the plurality of resilient dampers;
    wherein the second compressor bracket comprises two sub-brackets, which are respectively arranged at two opposite sides which are arranged along a longitudinal direction of the first compressor bracket;
    the resilient damper comprises:
    a first inner sleeve comprising a first main body and a first limit rubber sleeved around the first main body.

2. The suspension system for vehicle air conditioner compressor according to claim 1, wherein each of the resilient dampers is arranged along a vertical direction, each of the rubber dampers is arranged along a horizontal direction, and the plurality of the rubber dampers are respectively disposed at opposite sides of the first compressor bracket.

3. The suspension system for vehicle air conditioner compressor according to claim 1, wherein the resilient damper further comprises:
    a first limit flange protruding from an outer surface of the first main body;
    an outer surface of the first limit rubber is provided with a limit ring protruding therefrom, the damper spring is sleeved around the first limit rubber and disposed between the first limit flange and the limit ring.

4. The suspension system for vehicle air conditioner compressor according to claim 3, wherein the resilient damper further comprises:
    a limit washer sleeved around the first main body and located at a bottom portion of the first limit rubber;
    the suspension system further comprises:

a fastening assembly configured for passing through the first inner sleeve and the limit washer to mount the resilient damper between the first compressor bracket and the second compressor bracket.

5. The suspension system for vehicle air conditioner compressor according to claim 4, wherein a bottom surface of the first limit flange abuts against a-bottom contacts with a top surface of the first compressor bracket, and a bottom surface of the limit washer abuts against a top surface of the second compressor bracket;
the first compressor bracket and the second compressor bracket are both provided with a plurality of bolt mounting holes aligned with each other; and
the fastening assembly comprises a plurality of fastening bolts and a plurality of nuts, the plurality of fastening bolts are configured for sequentially passing through the bolt mounting holes of the first compressor bracket, the first inner sleeves, the limit washers and the bolt mounting holes of the second compressor bracket and being tightened by the plurality of nuts.

6. The suspension system for vehicle air conditioner compressor according to claim 1, wherein a top surface and a bottom surface of the first limit rubber are provided with a plurality of bulges.

7. The mounting system for vehicle air conditioner compressor according to claim 1, wherein the rubber damper comprises:
a second inner sleeve comprising a second main body and a second limit flange protruding from an outer surface of the second main body; and
a second limit rubber connected to an outside of the second main body by interference fit.

8. The suspension system for vehicle air conditioner compressor according to claim 7, wherein the first compressor bracket is provided with a plurality of second mounting holes at positions corresponding to the rubber dampers, the second limit rubber is clamped in the second mounting hole.

9. The suspension system for vehicle air conditioner compressor according to claim 7, wherein further comprising a plurality of fasteners, which are configured for connecting with the vehicle air conditioner compressor after passing through the second inner sleeve.

10. The suspension system for vehicle air conditioner compressor according to claim 1, wherein the first compressor bracket has a first side, a second side opposite to the first side, a third side and a fourth side opposite to the third side, the first side is provided with one rubber damper, the second side is provided with two rubber dampers, and the third side is provided with one resilient damper, the fourth side is provided with two resilient dampers.

11. The suspension system for vehicle air conditioner compressor according to claim 1, wherein the first compressor bracket and the second compressor bracket are made of high-pressure cast aluminum alloy.

12. The suspension system for vehicle air conditioner compressor according to claim 1, wherein the second compressor bracket is arranged on a top portion of the vehicle body.

13. A vehicle, comprising a vehicle air conditioner compressor, a vehicle body and a suspension system for the vehicle air conditioner compressor, the suspension system comprising:
a plurality of rubber dampers;
a plurality of resilient dampers with a plurality of damper springs;
a first compressor bracket connected with the vehicle air conditioner compressor through the plurality of rubber dampers;
a second compressor bracket connected with a vehicle body and connected with the first compressor bracket through the plurality of resilient dampers,
wherein the second compressor bracket comprises two sub-brackets, which are respectively arranged at two opposite sides which are arranged along a longitudinal direction of the first compressor bracket;
the resilient damper comprises:
a first inner sleeve comprising a first main body and a first limit rubber sleeved around the first main body.

14. The vehicle according to claim 13, wherein each of the resilient dampers is arranged along a vertical direction, and each of the rubber dampers is arranged along a horizontal direction.

15. The vehicle according to claim 14, wherein the resilient damper further comprises:
a limit washer sleeved around the first main body and located at a bottom portion of the first limit rubber;
the suspension system further comprises:
a fastening assembly configured for passing through the first inner sleeve and the limit washer to mount the resilient damper between the first compressor bracket and the second compressor bracket.

16. The vehicle according to claim 13, wherein the resilient damper further comprises:
a first limit flange protruding from an outer surface of the first main body;
an outer surface of the first limit rubber is provided with a limit ring protruding therefrom, the damper spring is sleeved around the first limit rubber and disposed between the first limit flange and the limit ring.

17. The vehicle according to claim 13, wherein the rubber damper comprises:
a second inner sleeve comprising a second main body and a second limit flange protruding from an outer surface of the second main body; and
a second limit rubber connected to an outside of the second main body by interference fit connection.

* * * * *